US005290058A

United States Patent [19]

Adams et al.

[11] Patent Number: 5,290,058

[45] Date of Patent: Mar. 1, 1994

[54] MOBILE PEDIATRICS CART

[76] Inventors: Lorna D. Adams; Mark D. Adams, both of 15530 E. Oxford Ave., Aurora, Colo. 80013

[21] Appl. No.: 29,414

[22] Filed: Mar. 10, 1993

[51] Int. Cl.5 ....... B62B 3/02

[52] U.S. Cl. ....... 280/651; 280/659; 280/47.34; 280/47.35; 108/143

[58] Field of Search ....... 280/639, 640, 651, 659, 280/47.34, 47.35, 79.11, 79.2; 248/127, 128, 129; 108/39, 143

[56] References Cited

U.S. PATENT DOCUMENTS

| | | | |
|---|---|---|---|
| 2,856,253 | 10/1958 | Flynn | 280/47.35 |
| 3,262,714 | 7/1966 | Langone | 280/79.2 |
| 3,853,329 | 12/1974 | McDonald | 280/47.35 |
| 3,889,967 | 6/1975 | Sauer | 280/47.35 |
| 4,652,062 | 3/1987 | Greenwood | 280/47.35 |
| 4,875,696 | 10/1989 | Welch et al. | 280/47.34 |
| 5,078,414 | 1/1992 | Court et al. | 280/47.35 |

*Primary Examiner*—Richard M. Camby
*Attorney, Agent, or Firm*—E. Michael Combs

[57] ABSTRACT

A mobile cart used for effecting a plurality of pediatric functions is disclosed. The cart is constructed of stainless steel and has a substantially rectangular frame and walls which form an enclosed housing having a plurality of storage shelves and drawers therein. The housing is mounted on four casters for mobility. A combination examining, weighing, measuring, and treating table for receiving infants thereon is slidably mounted on the upper surface of the housing and is movable between a closed position on the upper surface and an open position completely removed from the upper surface. In the open position, the table is supported on a handle attached to the housing. A bath basin is positioned below the upper surface of the housing, and is accessible through an opening in the upper surface when the table is in the open position. A digital scale is positioned in the housing and connected to the table for weighing the infants. Water and cleaning agent handling equipment are provided within the housing to supply water and cleaning agents to and remove them from the bath basin.

14 Claims, 4 Drawing Sheets

MOBILE PEDIATRICS CART

BACKGROUND OF THE INVENTION

1. Field of the Invention

The field of the invention relates to multi-functional health care apparatuses, and more particularly to a mobile pediatrics cart which is configured to provide a self-contained, easily-accessible and safe apparatus for receiving, measuring, weighing, examining, bathing, and otherwise treating infants in a single, uncongested work station.

2. Description of the Prior Art

Pediatric care in hospital maternity wards is conventionally practiced in designated areas thereof. More specifically, a plurality of fixed and separate work stations for individually performing each pediatric function such as measuring, weighing, examining, bathing, or otherwise treating the infants are provided in those designated areas. In some instances, hospitals employ mobile bathing carts. However, none of these carts are equipped to preform the other previously noted and usual pediatric functions.

As such, it may be appreciated that there continues to be a need for a new and improved mobile pediatrics cart which addresses both the problems of ease of use, portability, and effectiveness in construction, and in this respect, the present invention fulfills this need.

SUMMARY OF THE INVENTION

In view of the foregoing disadvantages inherent in the known types of multi-functional health care apparatuses now present in the prior art, the present invention provides a mobile pediatrics cart. As such, the general purpose of the present invention, which will be described subsequently in greater detail, is to provide a new and improved mobile pediatrics cart which has all the advantages of the prior art multi-functional health care apparatuses and none of the disadvantages.

To attain this, the present invention includes a mobile cart for effecting a plurality of pediatric functions. The cart is constructed of stainless steel and has a substantially rectangular frame and walls which form an enclosed housing having a plurality of storage shelves and drawers therein. The housing is mounted on four casters for mobility. A combination examining, weighing, measuring, and treating table for receiving infants thereon is slidably mounted on the upper surface of the housing and is movable between a closed position on the upper surface and an open position completely removed from the upper surface. In the open position, the table is supported on a handle attached to the housing. The handle is positioned laterally of and adjacent to the upper surface of the housing. A bath basin is positioned below the upper surface of the housing, and is accessible through an opening in the upper surface when the table is in the open position. A digital scale is positioned in the housing and connected to the table for weighing the infants. Water and cleaning agent handling equipment, and control elements connected thereto, are provided within the housing to supply water and cleaning agents to and remove them from the bath basin. The mobile pediatrics cart of the present invention is primarily intended for, although not exclusively limited to, use in hospital pediatrics departments and particularly maternity wards thereof.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the included abstract is to enable the U.S. Patent and Trademark Office and the public generally, and especially the scientists, engineers, and practitioners in the art who are not familiar with patent or legal terms or phraseology, to determine quickly from a cursory inspection, the nature and essence of the technical disclosure of the application. The abstract is neither intended to define the invention of the application, which is measured by the claims, nor is it intended to be limiting as to the scope of the invention in any way.

It is therefore an object of the invention to provide a new and improved mobile pediatrics cart which has all the advantages of the prior art multi functional health care apparatuses and none of the disadvantages.

It is another object of the present invention to provide a new and improved mobile pediatrics cart which may be easily and efficiently manufactured and marketed.

It is a further object of the present invention to provide a new and improved mobile pediatrics cart which is of durable and reliable construction.

An even further object of the present invention is to provide a new and improved mobile pediatrics cart which is susceptible of a low cost of manufacture with regard to both materials and labor, and which accordingly is then susceptible of low prices of sale to the consuming public, thereby making such mobile pediatrics carts economically available to the buying public.

Still yet another object of the present invention is to provide a new and improved mobile pediatrics cart which provides in the apparatuses and methods of the prior art some of the advantages thereof, while simultaneously overcoming some of the disadvantages normally associated therewith.

Still another object of the present invention is to provide a new and improved mobile pediatrics cart which is totally provided with the necessary equipment and supplies to effect all of the conventional pediatric functions in a single work station.

Yet another object of the present invention is to provide a new and improved mobile pediatrics cart which is uncongested and easily accessible from all sides.

Even still another object of the present invention is to provide a new and improved mobile pediatrics cart which is readily transportable to any desired infant location, thereby eliminating all unnecessary infant movement which in turn increases the safety of infant handling.

Still another object of the present invention is to provide a new and improved mobile pediatrics cart which is readily available and is constructed and dimensioned to effect pediatric functions at a comfortable work height.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
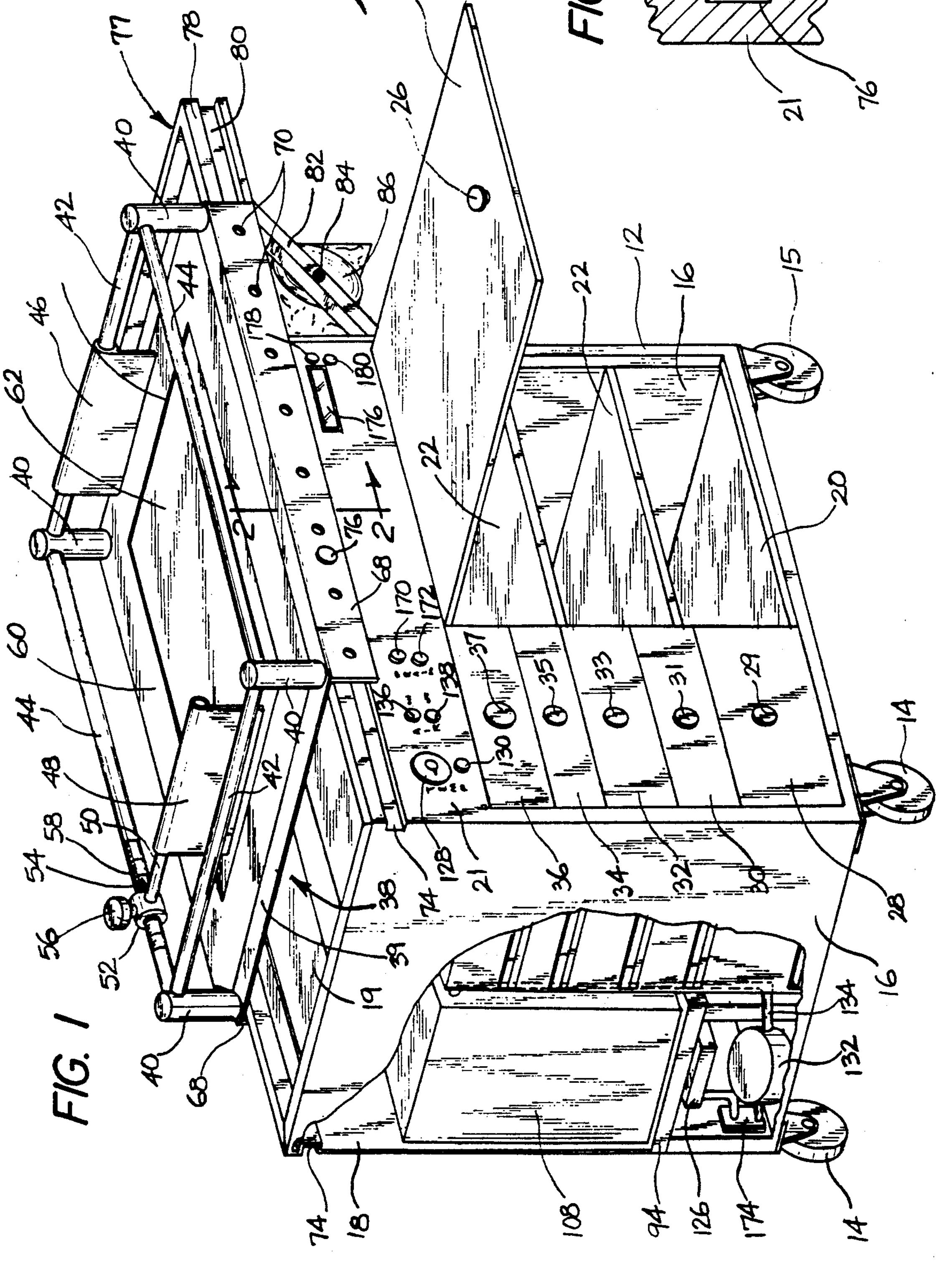
FIG. 1 is a perspective view of the mobile pediatrics cart of the present invention.

With reference now to the drawings, and in particular to FIGS. 1–8 thereof, a new and improved mobile pediatrics cart embodying the principles and concepts of the present invention and generally designated by the reference numeral 10 will be described.

Figure 2:
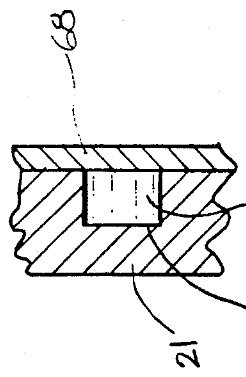
FIG. 2 is a cross-sectional view taken along line 2—2 in FIG. 1.
Figure 4:
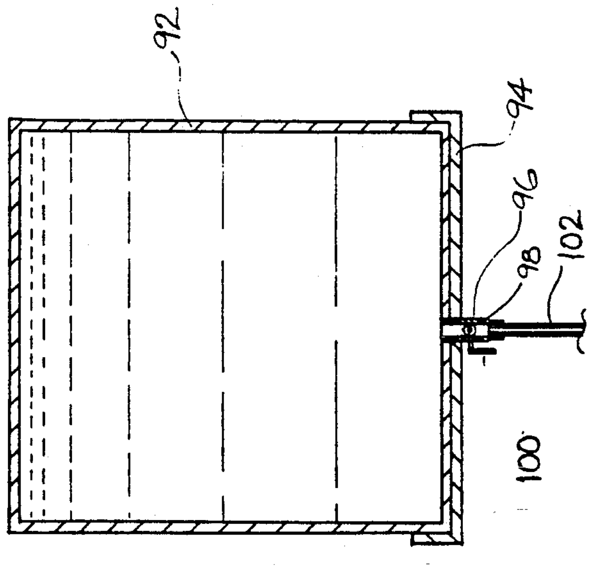
FIG. 4 is a cross-sectional view taken along line 4—4 in FIG. 3.

More specifically, and with particular reference to FIGS. 1 and 2, mobile pediatrics cart 10 of the present invention essentially comprises an enclosed, stainless steel housing including a tubular framework 12, a pair of parallel side walls 16, a rear wall 18, an upper wall 19, a bottom wall 20, and a front panel 21 which extends downwardly from upper wall 19. Positioned below panel 21 and extending approximately half way into the housing are a pair of storage shelves 22. Shelves 22 are attached at one side to a side wall 16, at their opposite sides to a vertical dividing wall (not shown), and at their inner sides to an interior end wall (not shown) within the housing. With this construction, shelves 22 form three storage compartments for supplies such as linen and associated medical items. Access to the storage compartments is provided by door 24 pivotally joined to the bottom edge of panel 21. Door 24 has an operating knob 26 thereon and is opened by pivoting it upward to a horizontal position and then sliding it inwardly into the housing in a position overlying top shelf 22. Positioned adjacent to the storage compartments are a plurality of storage drawers 28,30,32,34, and 36 which are provided with operating knobs 29,31,33,35, and 37 thereon, respectively. These drawers are also useable for treating supplies as well as examining instruments, etc. Drawers 28,30,32,34, and 36 extend laterally between the vertical dividing wall and the other side wall 16, and are slidable into and out of the housing on conventional tracks (not shown). The housing is supported at one end by a stationary caster 14 attached to each corner of the housing at bottom wall 20, and at the opposite end by a swiveling caster 15 attached to each corner of the housing at bottom wall 20. Casters 15 are also provided with locking means (not shown) to immobilize the cart 10 after it has been positioned in a desired location. Casters 14 and 15 are preferably constructed of rigid polymeric material such as Neoprene.

Slidably positioned on the outer surface of upper wall 19 is a combination examination, weighing, measuring, and treating table 38. Table 38 is channel-shaped and has a large planar middle section 39 positioned in sliding contact with the outer surface of upper wall 19. Mounted on each corner of table section 39 is a vertically upstanding post 40. Attached to corner posts 40 in a position overlying section 39 are a pair of parallel lateral guard rails 42, and a pair of parallel longitudinal guard rails 44. In combination, posts 40, guard rails 42,44, and table section 39 form a substantially rectangular infant-receiving enclosure for table 38. A stadiometer for measuring infant height is provided on table 38. The stadiometer includes a contact plate 46 slidably mounted on and extending downwardly from one lateral guard rail 42. Another contact plate 48 is slidably mounted on and extends downwardly from a support bar 50. Contact plates 46 and 48 are further provided with securing fasteners (not shown) which permit adjustment of their lateral positions on lateral guard rail 42 and support bar 50, respectively. Bar 50 is mounted on a support sleeve 52 which in turn is slidably mounted on one of longitudinal guard rails 44. Contact plates 46,48, and guard rails 42 and support bar 50 are arranged parallel to each other. Secured to and extending outwardly from one end face of support sleeve 52 is a pointer 54 which overlies a measuring scale 58 imprinted on an adjacent section of guard rail 44. Scale 58 may be marked in either inches or centimeters, or both. A securing screw 56 is mounted on sleeve 52 to bear against guard rail 44 to fix sleeve 52 and pointer 54 in a desired longitudinal position overlying scale 58 on guard rail 44, and, at the same time, fix bar 50 and contact plate 48 at a desired longitudinal spacing from contact plate 46 which represents a measure of an infant height which is indicated on scale 58. Table section 39 is further provided with a padded and upholstered border 60 (FIGS. 1 and 3) which defines a center portion 62 for table section 39. Mounted on center portion 62 is a pressure sensing pad 64, and removably placed on pad 64 is a padded, washable, and replaceable cover 66. Table 38 further includes a pair of parallel side walls 68 extending integrally and downwardly from the opposed side edges of section 39 in sliding contact with upper portions of rear wall 18 and front panel 21 (FIGS. 1 and 2). Each side wall 68 is provided with a plurality of holes 70 for mounting a support roller 72 in each hole 70. A support roller receiving track 74 is formed in the upper portion of rear wall 18, and another track 74 is formed in the upper portion of front panel 21. Tracks 74 extend along the entire length of the housing, are parallel to each other, and receive the support rollers 72 therein to enable sliding movement of table 38. Attached to one end of the housing in a position coplanar with upper wall 19 is a U-shaped handle 77 having a pair of parallel side legs 78. Each side leg 78 has a support roller track 80 for receiving support rollers 72 therein. Tracks 80 are parallel with each other and longitudinally aligned with tracks 74 to form a pair of continuous tracks 74,80 which receive rollers 72. A pin 76 is mounted in a table side wall 68 and is operable to lock table 38 in a selected longitudinal position along tracks 74,80. Mounted below handle 77 are a pair of support brackets 82. Each bracket 82 is fixed at one end to side wall 16, extends angularly upwardly therefrom, and is fixed at its opposite end to a respective underside of each side opposed leg 78. Rotatably mounted on and extending between opposed legs 78 is a support shaft 84 for receiving a roll of sanitary paper 86 thereon.

Figure 3:
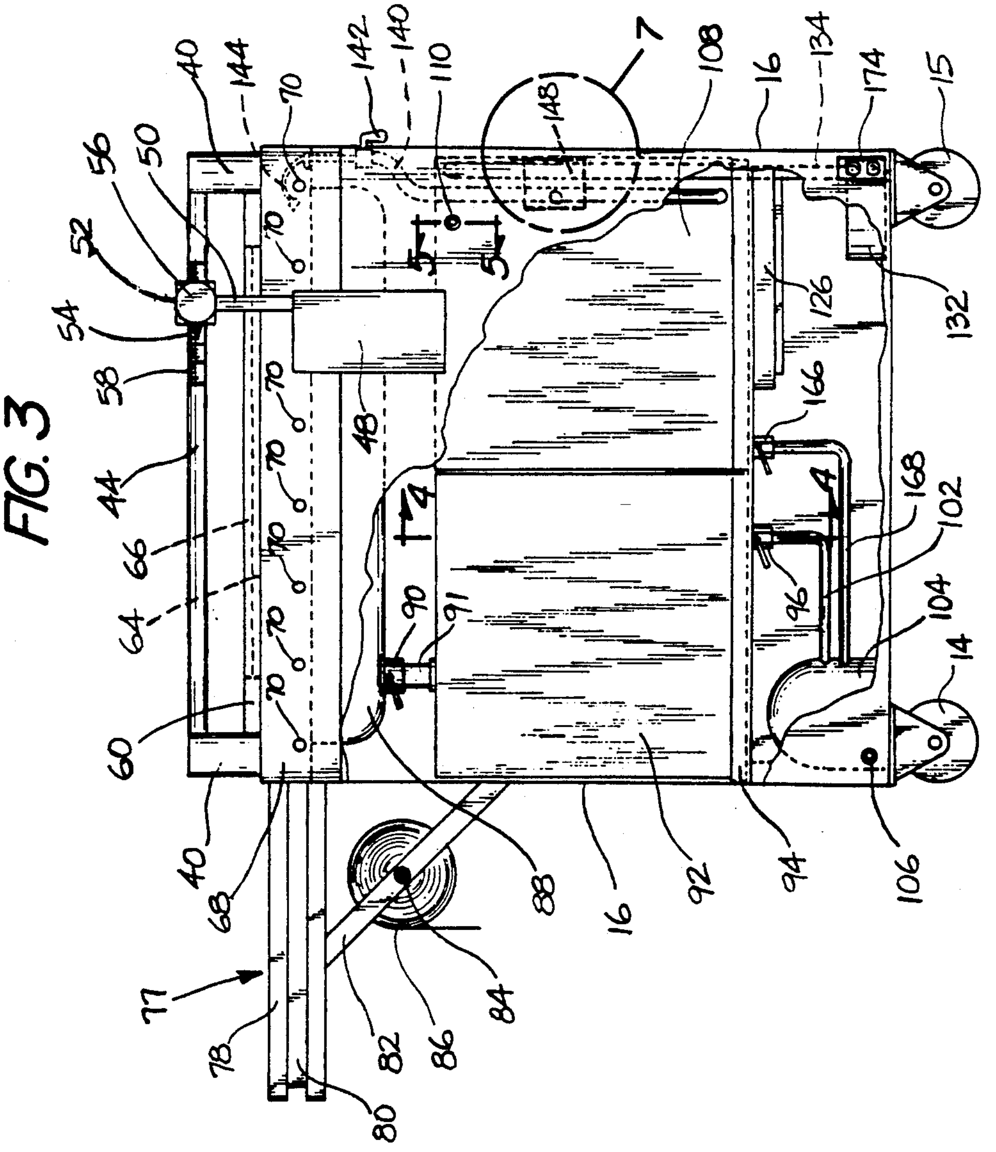
FIG. 3 is a rear elevational view of the mobile pediatrics cart of the present invention.
Figure 5:
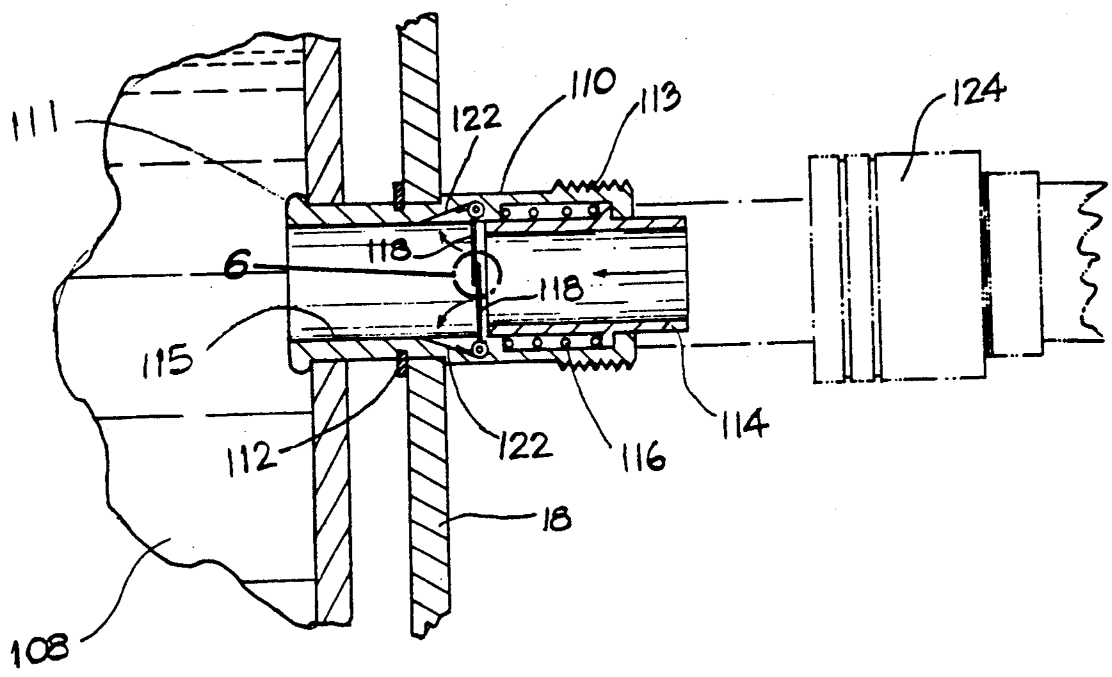
FIG. 5 is a cross-sectional view taken along line 5—5 in FIG. 3.
Figure 6:
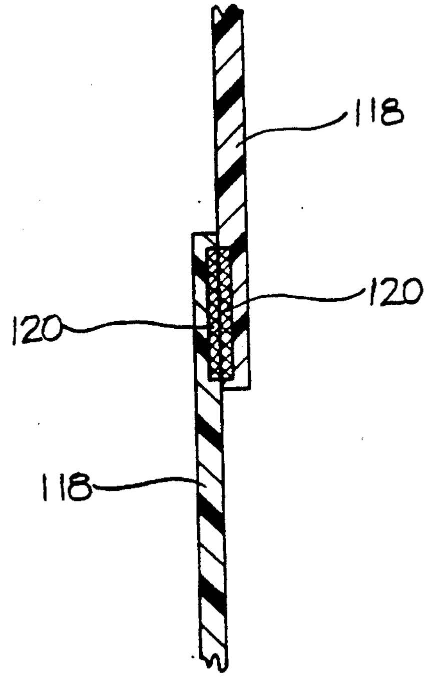
FIG. 6 is a cross-sectional view of those portions of the water inlet closing flaps lying within circle 6 in FIG. 5.
Figure 7:
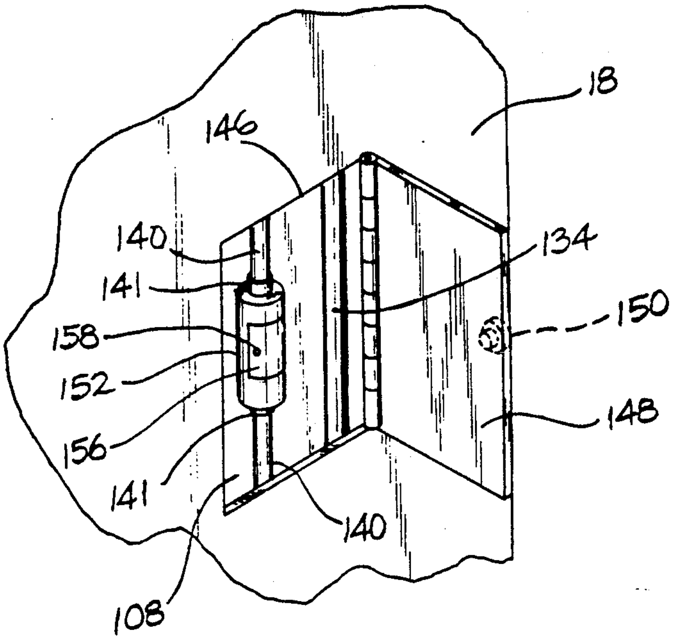
FIG. 7 is a perspective view of those portions of the mobile pediatrics cart of the present invention lying within circle 7 in FIG. 3.
Figure 8:
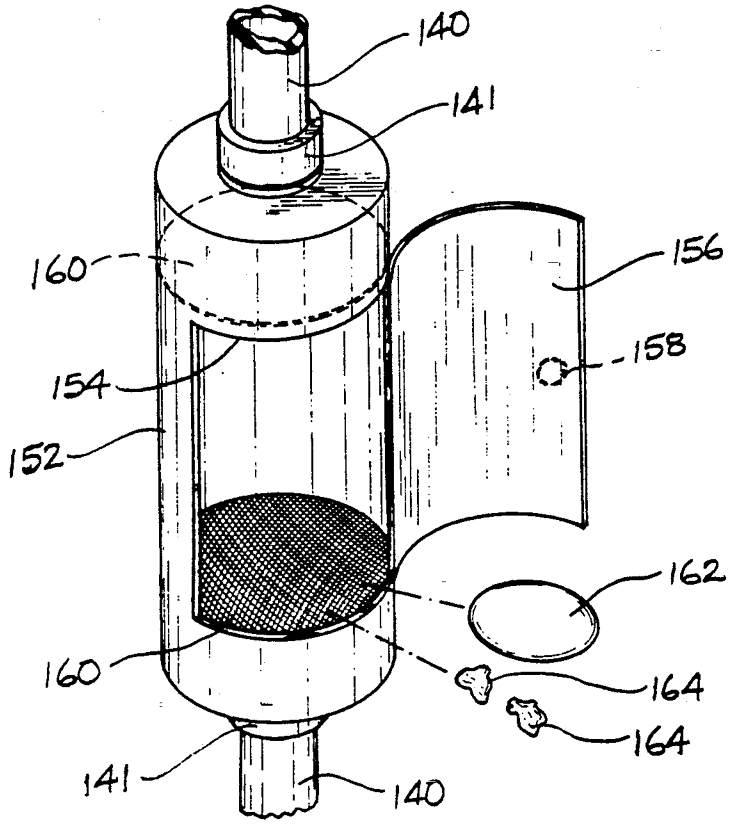
FIG. 8 is a perspective view of the mixing cylinder shown In FIG. 7.

Positioned within the housing at a location below table 38 and upper wall 19 is a bath basin 88 (FIG. 3). A water outlet 90 extends from the lower end of basin 88 and contains a manually operable ball valve (not shown). A drain pipe 91 is connected to outlet 90 at one end thereof and to waste water tank 92 at its opposite end. The ball valve in outlet 90 enables drainage of the waste water from basin 88 and into tank 92 after use in basin 88. Tank 92 is mounted o support shelf 94 (FIGS. 1,3 and 4) which is connected at each of its opposite ends to side walls 16 and extends approximately half way into the housing from rear wall 18 to an area adjacent the rear portions of storage shelves 22 and drawers 28,30,32,34,36. A water outlet 96 extends through the bottom of tank 92 and shelf 94. A ball valve 98 is positioned in outlet 96 and is operated manually by handle 100. A waste water discharge conduit 102 extends from outlet 96 to discharge pump 104. A discharge hose connector 106 is mounted on and extends through rear wall 18 and into pump 104. A clean water tank 108 is mounted on shelf 94 in a position adjacent waste water tank 92. A water inlet 110 extends through rear wall 18 and into tank 108 at an upper location thereon. As illustrated in FIGS. 5 and 6, inlet 110 is secured to the wall of tank 108 by its flanged outer end 111, and to rear wall 18 by locking ring 112. Inlet 110 has a threaded end 113 positioned outside of rear wall 18. A sleeve 114 is slidably mounted in central bore 115 in a position adjacent threaded end 113. Sleeve 114 is biased outwardly from bore 115 by a spring 116 so that one end of sleeve 114 adjacent threaded end 113 is removed from bore 115. Immediately forward of the opposite end of sleeve 114 in a position within bore 115 are a pair of flexible closing flaps 118, wherein each flap 118 has a magnet 120 imbedded in its outer end. Flaps 118 may be constructed of polymeric material and are pivotally secured to bore 115 at diametrically opposed points thereon so that the flaps extend toward the center of bore 115 and overlap with their respective magnets being engaged to sealingly close the bore 115. Flaps 118 are each biased into a closed position by a spring 122. When it is desired to put water in tank 108, a supply hose connector 124 is threaded onto threaded end 113. This causes connector 124 to push sleeve 114 further into bore 115 against the bias of spring 116 until the inner end of sleeve 114 pushes against both flaps 118 which separates magnets 120 and pivots flaps 118 away from each other, i.e. in the direction of the arrows as shown in FIG. 5, against the bias of springs 122 and into a completely open position wherein flaps 118 are pressed against the diametrically opposed points of bore 115. In this position, the water source may be turned on and water can flow through inlet 110 and into tank 108. After a desired amount of water has been placed in tank 108, the water supply is turned off and connector 124 is threaded off end 113 which permits springs 116 and 122 to return sleeve 114 and flaps 118, respectively, to their closed positions shown in FIGS. 5 and 6. A water heater 126 is positioned immediately below tank 108 and shelf 94 to heat the clean bath water (FIGS. 1 and 3). Water heater 126 is controlled by a thermostat 128 for regulating water temperature and an operating button 130. Controls 128 and 130 are wired to heater 126 and mounted on front panel 21 (FIG. 1). Mounted below heater 126 on bottom wall 20 is an air compressor 132 for pressurizing tank 108 (FIGS. 1 and 3). Compressor 132 is connected to water tank 108 at a location near its upper end by an air hose 134. On and off switches 136,138, respectively, are wired to and control compressor 132, and are mounted on front panel 21. A flexible water tube 140 is connected at one end thereof to tank 108 at a lower end thereof, and to a manually operated on/off valve 142 at an opposite end thereof. Mounted on an opposite side of valve 142 is a faucet 144 having a straight portion and an arcuate portion which extends integrally from the straight portion and overlies basin 88. Clean water is deposited into basin 88 by opening valve 142 which forces water from pressurized tank 108, through faucet 144, and into basin 88. A substantially rectangular opening 148 (FIGS. 3 and 7) is formed in rear wall 18 in a position overlying tank 108. Opening 146 is covered by a hinged door 148 having an operating knob 150 mounted thereon. Mounted on water tube 140 at a position within the housing behind door 148 and in front of tank 108 is a mixing cylinder 152 (FIGS. 7 and 8). Cylinder 152 has a flange (not shown) at each end thereof, and each flange is positioned within and secured to a fitting 141 on each end of water tube 140. An arcuate opening 154 is formed in the wall of cylinder 152. Opening 154 is covered by an arcuate hinged door 156 having an operating knob 158 mounted thereon. A mesh screen 160 is positioned adjacent each end of cylinder 152. Cleaning agents such as bath oil gel capsules 162 or bath crystals 164 may be placed on lower screen 160 through an open door 156. When water is being fed through tube 140 for deposit into tank 108 as previously described, it passes through cylinder 152 and is thoroughly mixed with either cleaning agent for delivery to basin 88. Screens 160 also function as filters to prevent any undissolved cleaning agent from leaving cylinder 152. A water outlet 166 extends from the bottom of tank 108 and contains a manually operable ball valve (not shown) therein. A water outlet tube 168 is connected at one end thereof to outlet 166, and at its opposite end to discharge pump 104. On and off switches 170,172, respectively, are wired to and control discharge pump 104, and are mounted on front panel 21. Water tank 92 may be drained by manually opening the ball valve in outlet 96 and actuating pump 104 which discharges the water from tank 92 and out of the housing through a discharge hose attached to connector 106. Similarly, water tank 108 may be drained by manually opening the ball valve in outlet 166 and discharging the water from tank 108 through the same discharge hose attached to connector 106 using pump 104. Electrical power connecting plates 174 (only one is shown in FIGS. 1 and 3) may be mounted on the lower ends of rear wall 18. Discharge pump 104, heater 126, and compressor 132 are wired to plates 174 which receive electrical power chords for operating those elements.

A battery-operated digital weighing scale (not shown) is mounted behind front panel 21 in front of basin 88 in a position under table 38 and upper wall 19. The battery used for the scale is preferably a nickel-cadmium rechargeable battery. The weighing scale is wired to pressure-sensing pad 64, and is provided with a digital readout 176 which is mounted in an opening in front panel 21. Reset and conversion control buttons 178,180, respectively, are wired to the scale and mounted in front panel 21. Reset button 176 is an on/off control for a weight sensed by the scale and displayed by readout 176, while conversion button 180 is a control for selectively displaying a sensed weight in either ounces or kilograms.

In use, an operator grasps the long cross bar of handle 77 and pushes and maneuvers cart 10 into a desired operating location in the hospital using handle 77. The locking means on casters 15 then are activated to render them stationary and thereby fix the cart 10 in the noted location. Table 38 may be either placed and locked (using pin 76) in the closed position, i.e. in overlying and coextensive relationship with upper wall 19 and covering basin 88, or in the open position which completely exposes basin 88 positioned below upper wall 19 in alignment with the access opening therein (not shown), i.e. completely removed from upper wall 19 and supported solely on handle 77. In an exemplary construction of cart 10, upper wall 19 and table 38 may have a length of 32", handle 77 may be 16" long, and table 38 may be supported by eight pairs of rollers 72. Accordingly, in the open position, half of table 38 would be supported by four pairs of rollers 72 in tracks 80 while the other half of table 38 and four pairs of rollers 72 would be unsupported and overhang handle 77 in cantilevered fashion. Therefore, the provision of a multiplicity of pairs of rollers 72 in track 80 supporting table 38 in the open position maintains the table 38 stable in the open position and insures longitudinal alignment of tracks 74,80 for later movement of the table to the closed position, i.e. the rollers 72 prevent sagging of table due to the noted overhang.

An exemplary bathing procedure will now be described. Table 38 is placed in the open position and locked therein by pin 76. Electrical power cords are connected to connection plates 174, and a water supply hose is connected to water inlet 110. A desired amount of water is the fed into tank 108 through inlet 110. The ball valve in water outlet 90 is manually closed. Water heater 126 is then operated using controls 128,130 to heat the clean water in tank 108. Air compressor 132 is activated to pressurize the water in tank 108. Valve 142 is manually opened to deliver a desired amount of heated water to basin 88 via tube 140 and faucet 144, and then closed. If desired, the heated water delivered to basin 88 may be mixed with cleaning agents as it passes through water tube 140 and mixing cylinder 152 in the manner previously described. As a safety precaution, all the utilities (both water and electrical) are disconnected during infant contact with cart 10. An infant may then be placed in basin 88 and bathed. To provide further comfort and to enhance safe infant handling during bathing, the infant may alternatively be secured in a molded, non-skid seat (not shown) and then placed in basin 88. The noted seat may be stored on one of the shelves 22. After bathing, the infant is removed from basin 88. The ball valve in outlet 90 is manually opened, and the bath water in drained from basin 88 into tank 92. A discharge hose is then engaged with connector 106 and a power cord is plugged into a connector 174 wired to pump 104. The ball valve in outlet 96 is manually opened and pump 104 is actuated to discharge waste water from tank 92 through tube 102 and the discharge hose.

To perform infant examining, weighing, height measuring, or other treating, table 38 may be locked in either its open or closed position. For weighing, examining or other treating, contact plate 48 and support bar 50 are first removed from their positions within the table enclosure (FIG. 1) by loosening the securing fasteners of plate 48 and securing screw 56. Plate 48, bar 52 and support sleeve 52 are rotated counterclockwise about 270 degrees around rail 44 to a position outside the table enclosure. In that position, screw 56 is retightened, plate 48 is rotated about bar 50, and the plate securing fasteners are retightened so that plate 48 and bar 50 lie against table side wall 68 and rear wall 18 (FIG. 3). Table section 39 is then covered with a section of sanitary paper separated from roll 86. For examining or other treating, the infant is then placed on the covered table section 39 unsupported or secured in the above-noted seat. For weighing, the infant is placed directly on covered table section 39 over pressure sensitive pad 64 whereupon the sensed weight is read on scale readout 176. Using control 180, the weight may be indicated in either ounces or kilograms. For height measuring, plate 48 and support bar 50 are returned to their FIG. 1 positions within the table enclosure. The infant is laid on covered section 39 between plates 46,48 and screw 56 is loosened. Plate 48, bar 50, and sleeve 52 are slid along rail 44 until plate 48 contacts either the head or feet end of the infant. Screw 56 is retightened and the infant's height is read, either in inches or centimeters, on scale 58 as indicated by pointer 54.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function, and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A mobile pediatrics cart comprising:

a housing having a substantially horizontal upper wall, wherein said upper wall has a pair of opposed side edges and an access opening therethrough;

wheel means secured to said housing for enabling rolling movement of said housing;

bathing means positioned within said housing at a location below said horizontal upper wall in alignment with said access opening;

handle means attached to said housing for moving and maneuvering said cart, said handle means extending laterally outwardly from one of said opposed side edges in alignment with said upper wall;

an infant-receiving examining and treating table; and, first mounting means for slidably mounting said examining and treating table on said upper wall and said handle means, said first mounting means being constructed and arranged to enable movement of said examining and treating table between a closed position in overlying and coextensive relationship with said upper wall and said access opening for covering said bathing means, and an open position wherein said examining and treating table is completely removed from said upper wall and is supported solely on said handle for exposing said bathing means through said access opening.

2. The mobile pediatrics cart of claim 1, further comprising first locking means on said examining and treating table for selectively fixing it in either said closed or said open position.

3. The mobile pediatrics cart of claim 1, wherein said first mounting means includes a plurality of rollers rotatably secured to said examining and treating table, and a plurality of separate first tracks formed on said housing, wherein each of said first tracks is dimensioned to receive an equal number of rollers of said plurality of rollers therein.

4. The mobile pediatrics cart of claim 3, wherein said first mounting means further comprises a plurality of separate second tracks formed on said handle, wherein each of said second tracks are longitudinally aligned with a respective one of said first tracks and each of said second tracks is dimensioned to receive said equal number of said rollers of said plurality of rollers therein.

5. The mobile pediatrics cart of claim 3, wherein said upper wall further includes a pair of parallel longitudinal edges connecting said side edges;

wherein said housing has a substantially vertical rear wall extending downwardly from one of said longitudinal edges, and a substantially vertical front panel extending downwardly from the other of said longitudinal edges;

wherein said examining and treating table has a planar middle section in sliding contact with said upper wall and a pair of parallel side walls, wherein one of said side walls extends downwardly from one longitudinal side of said planar middle section in overlying and sliding relationship with said rear wall, and the other of said side walls extends downwardly from an opposed longitudinal side of said planar middle section in overlying and sliding relationship with said front panel; and, wherein said plurality of first tracks comprise a pair of parallel first tracks, one of said first tracks being formed in said rear wall adjacent one of said longitudinal edges, and the other of said first tracks being formed in said front panel adjacent said other of said longitudinal edges, and wherein said equal number of said plurality of rollers are rotatably mounted on each of said table side walls.

6. The mobile pediatrics cart of claim 5, wherein said examining and treating table further comprises a plurality of spaced posts extending vertically upwardly from said planar middle section, and a plurality of guard rails overlying said planar middle section and joined to said spaced posts to form, in conjunction with said planar middle section, an enclosure for receiving an infant therein.

7. The mobile pediatrics cart of claim 5, wherein said first mounting means further comprises a plurality of separate second tracks formed on said handle, wherein each of said second tracks are longitudinally aligned with a respective one of said first tracks and each of said second tracks is dimensioned to receive said equal number of said rollers of said plurality of rollers therein.

8. The mobile pediatrics cart of claim 1, further comprising weight measuring means, wherein said weight measuring means includes pressure sensing means mounted on said examining and treating table, and first scale means mounted in said housing and connected to said pressure sensing means for measuring and indicating a weight of an infant positioned on said pressure sensing means.

9. The mobile pediatrics cart of claim further comprising;

storage means within said housing for stocking treating supplies and examining instruments therein.

10. The mobile pediatrics cart of claim 1, further comprising infant height measuring means mounted on said examining and treating table.

11. The mobile pediatrics cart of claim 10, wherein said height measuring means includes a first contact plate, a second contact plate arranged parallel to said first contact plate, second mounting means on said examining and treating table for slidably mounting said second securing plate thereon for movement relative to said first contact plate, second locking means for fixing said second contact plate at a selected distance from said first contact plate, and second scale means positioned adjacent said second mounting means for measuring said selected distance which is a measured height of an infant positioned between and in contact with said first and second plates.

12. The mobile pediatrics cart of claim 1, wherein said bathing means includes an infant-receiving basin, delivery means connected to said basin and positioned within said housing for supplying clean water to said basin, heating means positioned adjacent said delivery means and within said housing for heating said clean water, and discharge means connected to said basin and positioned within said housing for removing waste bath water from said basin and said housing.

13. The mobile pediatrics cart of claim 12, further comprising water inlet means mounted on said rear wall of said housing for receiving said clean water from an external source and supplying it to said delivery means, first conduit means connecting said water inlet means to said delivery means;

wherein said delivery means includes a water storage tank connected to said first conduit means, an air compressor for pressurizing said clean water in said water storage tank, second conduit means connecting said air compressor to said water storage tank, a faucet positioned in overlying relationship with said basin, third conduit means connecting said faucet to said water storage tank, and manually operable first valve means positioned in said third conduit means for selectively delivering heated water from said pressurized water storage tank to said basin via said faucet;

wherein said discharge means includes a waste water tank, fourth conduit means connecting said basin to said waste water tank, manually operable second valve means positioned in said fourth conduit means for selectively discharging waste water into said waste water tank, pump means, fifth conduit means connecting said waste water tank to said pump means, and manually operable third valve means positioned in said fifth conduit means for selectively discharging waste water from said waste water tank to said pump means;

water outlet means mounted on said rear wall of said housing and connected to said pump means, wherein said pump means discharges waste water from said waste water tank and said housing via said water outlet means; and, control means for actuating said heating means, said air compressor, and said pump means.

14. The mobile pediatrics cart of claim 13, further comprising mixing means in said third conduit means for dispersing cleaning agents in said clean water prior to its delivery to said basin.

* * * * *